Figure 1:
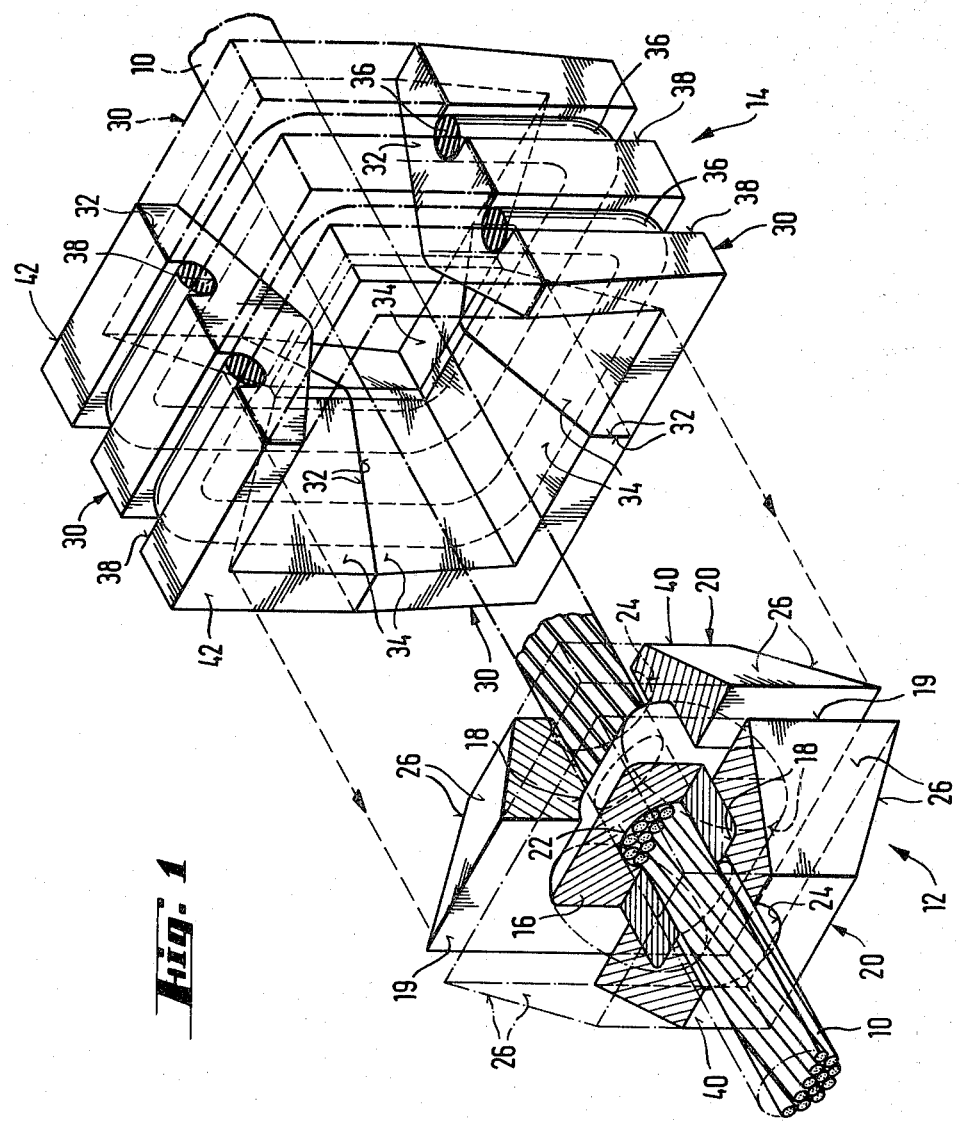

United States Patent [19]

Molz

[11] 4,378,689
[45] Apr. 5, 1983

[54] CORE FOR A PIPE THAT IS TO BE BENT
[75] Inventor: Theodor Molz, Chur, Switzerland
[73] Assignee: W. Eckold AG, Switzerland
[21] Appl. No.: 222,245
[22] Filed: Jan. 2, 1981
[30] Foreign Application Priority Data
  Jan. 4, 1980 [DE] Fed. Rep. of Germany ....... 3000170
[51] Int. Cl.[3] .............................................. B21D 9/03
[52] U.S. Cl. ......................................... 72/466; 72/478
[58] Field of Search ................. 72/393, 398, 466, 478, 72/479, 150; 269/48.1

[56] References Cited
U.S. PATENT DOCUMENTS

| | | | |
|---|---|---|---|
| 693,186 | 2/1902 | Sweet | 72/478 |
| 1,654,697 | 1/1928 | Mueller et al. | 72/466 |
| 1,856,597 | 5/1932 | Stjarnstrom | 72/466 |
| 2,044,322 | 6/1936 | Oliver et al. | 72/478 |
| 2,057,359 | 10/1936 | Baker | 72/478 |
| 4,059,036 | 11/1977 | Hartley | 269/48.1 |
| 4,086,803 | 5/1978 | Wheeler | 72/466 |

*Primary Examiner*—Lowell A. Larson
*Attorney, Agent, or Firm*—Peterson, Palmatier, Sturm, Sjoquist & Baker, Ltd.

[57] ABSTRACT

The pipe-bending core consists of elements which are coupled to one another in articulated manner and threaded like a string of pearls on a wire cable, and which are expanded on being pushed against one another, but nevertheless remain articulated. The principle can be applied to pipes of differing cross-section. After releasing the bracing arrangment, the elements contract again by means of spring bias, so that the core can easily be withdrawn from the bent pipe.

14 Claims, 5 Drawing Figures

CORE FOR A PIPE THAT IS TO BE BENT

The invention relates to a core for a pipe that is to be bent.

In order to prevent pipes from collapsing when being bent, a filler element which fits the pipe as exactly as possible is disposed in the pipe at least at the particular place subjected to bending stress. A stationary mandrel is used as a filler element of this kind, especially in bending apparatus for cylindrical pipes in which the pipe is drawn round a rotatable disc. Cores constructed in the manner of a chain from elements that are articulated to one another and packets consisting of flexible webs that can be moved relative to one another have also been tried as filling. All of these cores can be used only for bending radii up to a certain lower limit since it would otherwise not be possible to remove the cores. If a tighter bend is required, the pipe has to be filled with sand, rosin, a metal having a low melting point or the like and emptied again after bending. This, however, is a very time-consuming method.

The problem of the invention is to provide a core consisting of elements that are coupled to one another in articulated manner for pipes that are to bent, which core supports the pipes during bending while reliably preventing kinking and crease formation, but is nevertheless easy to remove after the bending operation.

The solution to this problem, provided according to the invention is given in the characterising part of patent claim 1.

The invention thus provides a flexible core in the form of a wire cable which absorbs the considerable tensile loads in the axial direction of the pipe. Expansible elements are threaded on the cable, which are brought into contact with the internal wall of the pipe by pushing together associated wedge elements which thereby expand the expanding elements with their wedge faces. The expansion distance can be such that it exceeds the narrowing of the pipe which occurs during bending, so that, after releasing the wedge arrangement, the core can be removed in its contracted state. For very small bending radii, if the pipe to be bent has walls parallel to the axis of bending, a flexible web can be inserted inside and outside of the curve which bridges the gap between successive expanding elements.

The subclaims define preferred embodiments of the subject of the invention; the significance of the features mentioned therein will be appreciated in detail in conjunction with the following description of embodiments.

Figure 2:
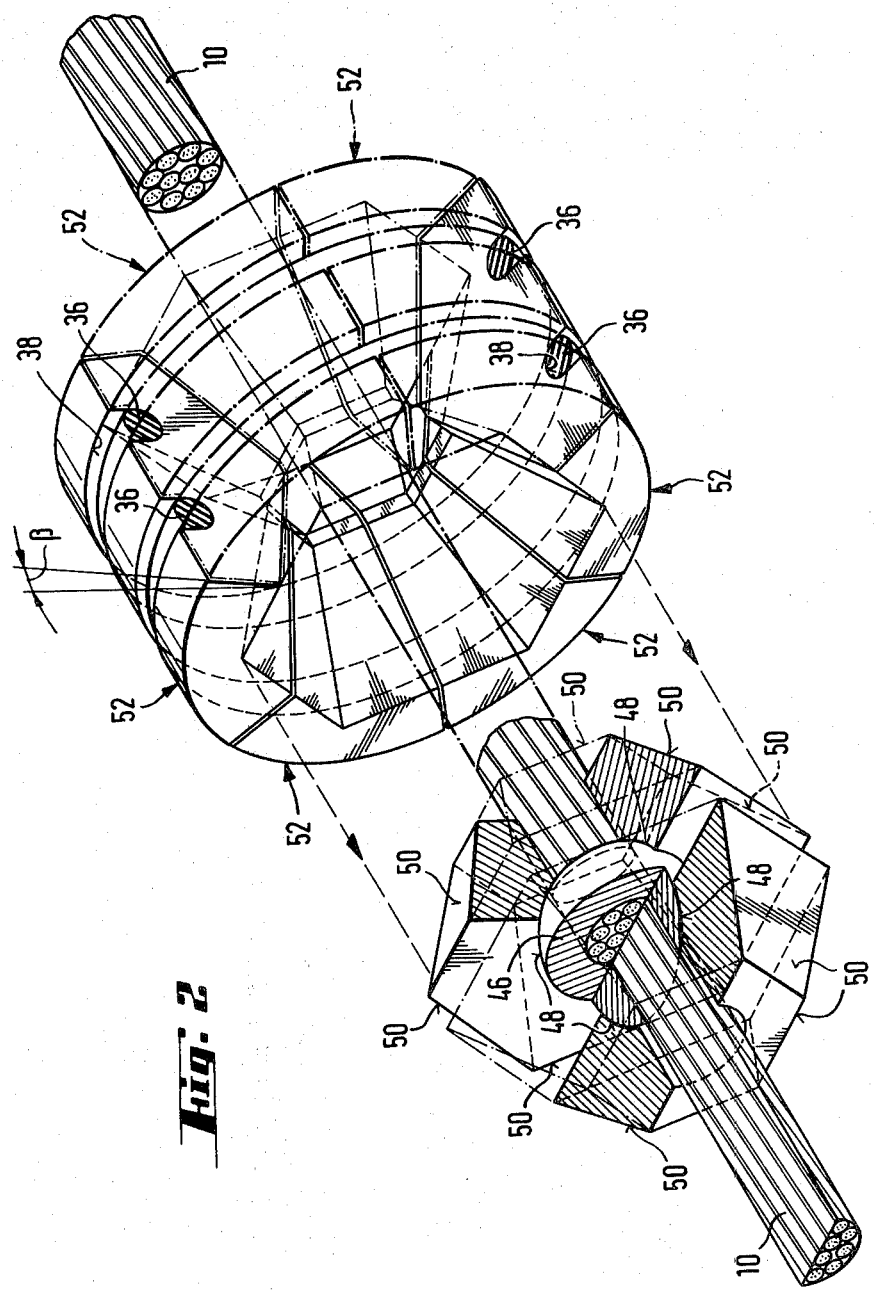
Figure 3:
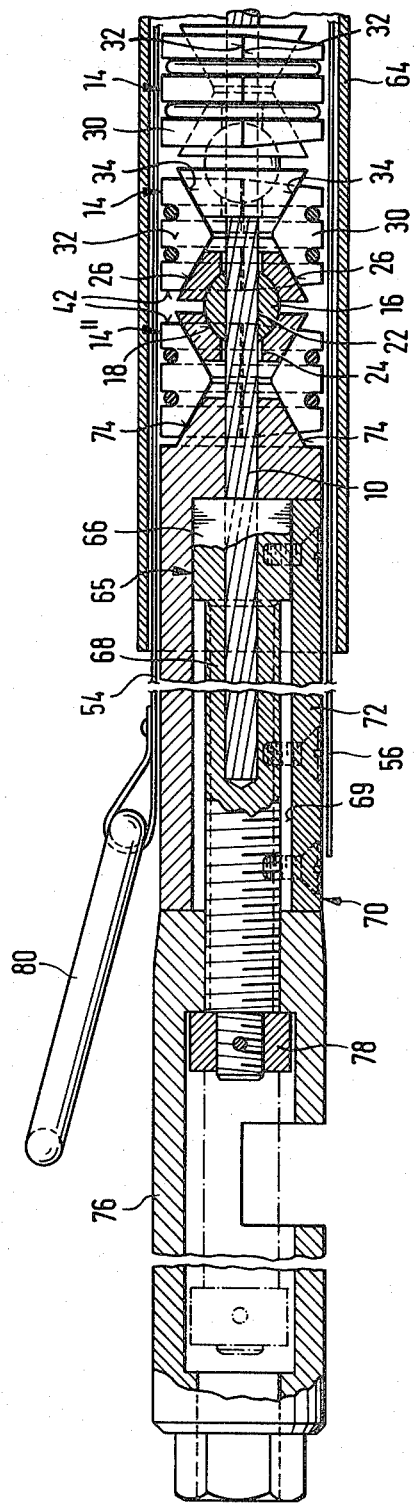
Figure 4:
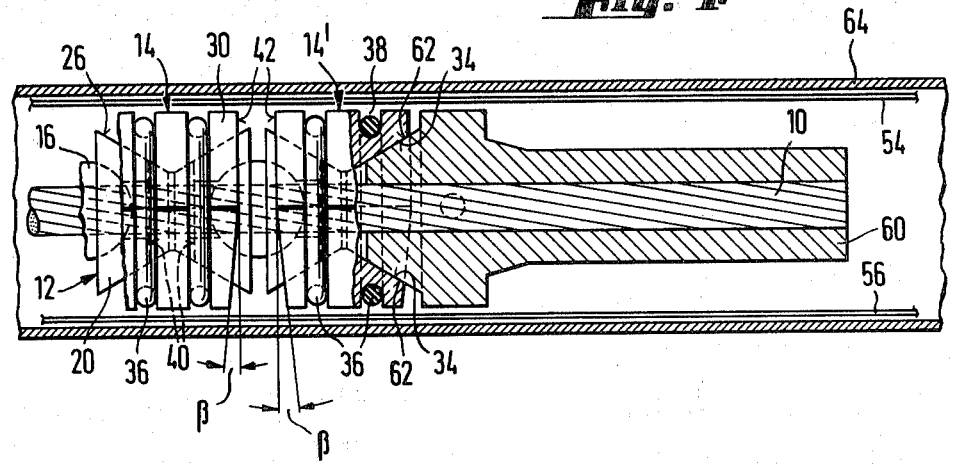
Figure 5:
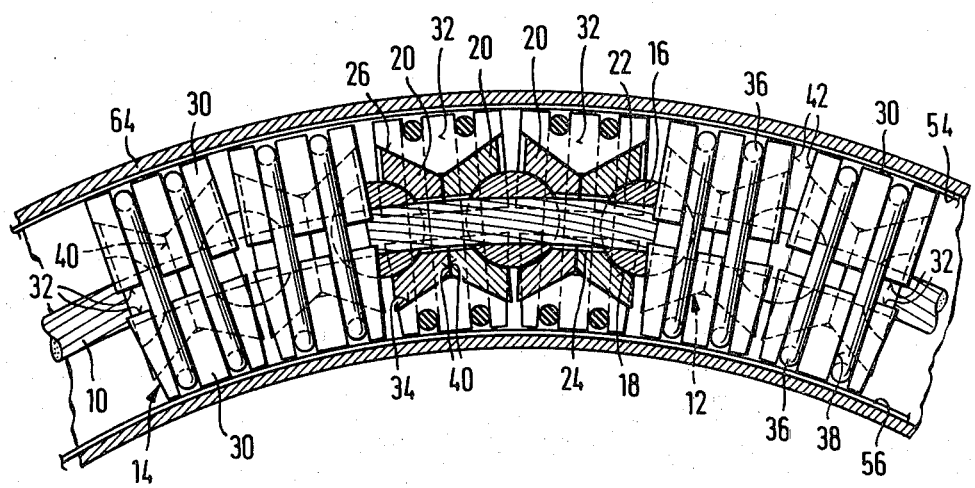

FIG. 1 shows in perspective, partially in section, a core constructed according to the invention for pipes of rectangular cross-section, FIG. 2 is a representation analogous to FIG. 1 of a core for cylindrical pipes, FIG. 3 shows in section the bracing sleeve end of the core shown in FIG. 1, FIG. 4 shows the stop end of the core shown in FIG. 3 and FIG. 5 illustrates the deformation of the core shown in FIGS. 1, 3 and 4 during the pipe-bending operation.

The basic construction of the core will be described first with reference to FIG. 1.

The wedge elements 12 and the expanding elements 14 are threaded alternately and separately from each other on a steel wire cable 10. Each wedge element 12 is itself articulated about an axis perpendicular to the plane in which the pipe is to be bent. In the embodiment shown in FIG. 1, the core is intended for a pipe of rectangular cross-section, so that the bending plane of the core also is predetermined and, therefore, the ability to pivot about only one axis is required. For this reason, a pivot joint is provided comprising a cylinder 16 and bearing shells 18 having the shape of a cylinder sector, complementary to the generated surface of the cylinder, in the faces 19, facing the cylinder 16, of two semi-wedge elements 20 which are identical to each other but arranged as mirror images of each other on the wire cable 10. When the cylinder 16 is accommodated in the bearing shells 18, the two faces 19 are spaced at such a distance from each other that the semi-wedge elements are able to tilt on the cylinder 16 in accordance with the maximum desired bending radius of the pipe (cf. FIG. 5). The cylinder 16 has a bore 22 extending transversely to its axis, which bore surrounds the wire cable 10 with just enough clearance for the cylinders to be still movable loosely; the bores 24 of the semi-wedge elements 20, which are coaxial with the bore 22, are slightly larger so that the centre of tilt is always determined by the axis of the cylinder and, even when the core is bent, the wire cable 10 does not come into contact with the bores 24.

Each semi-wedge element has the shape of a pyramidal frustum with the faces 19 as the base face. The sides 26 of the pyramid are inclined at an angle of 60° to the base face 19. They serve as wedge faces for expanding the expanding elements 14.

Each expanding element 14 comprises the same number of segments 30 as the semi-wedge elements have wedge faces, that is to say four segments in the embodiment. In the contracted state, the segments 30 of one expanding element form a complete ring having an external contour corresponding to the internal contour of the pipe to be bent, so that, in the embodiment, an external rectangular outline is produced. The planes of separation between the segments may extend diagonally with respect to the rectangular external contour; for manufacturing purposes, however, it is preferable to arrange the planes of separation—designated 32 in FIG. 1—in the planes of symmetry of the pipe to be bent, so that each segment, viewed along the axis of the cable 10, is L-shaped. Thus, even when the cross-section of the pipe is not square, all the segments assume the same shape in outline.

On the edge of the L facing the wire cable 10 the segments have counter wedge faces 34 complementary to the wedge faces 26 and inclined at angles that are of the same magnitude but opposite, so that two successive wedge elements, with their wedge faces facing each other, act together on the segments of the expanding element lying between them. The segments of each expanding element are resiliently biased in the contracted position. In the embodiment, resilient rings 36 are provided for this purpose, which are arranged in peripheral grooves 38 of the segments; customary commercial O-rings can be used for this purpose.

If the wedge elements are pushed together in the manner to be described hereinbelow, they expand the expanding elements against the bias of the O-rings 36 until the top faces 40 of the pyramidal frusta of two adjacent wedge elements rest against each other. The respectively immediately adjacent semi-wedge elements which are commonly assigned to one expanding element can thus be looked upon, together with that expanding element, as a "chain member" which is articulated to the next adjacent "chain members" by the cylinders 16 lying in each case towards the outside.

The dimensions of the expanding elements when in the contracted state determines together with the bracing distance which is in turn determined by the height of the pyramidal frusta, the difference between the contracted and expanded size of the core contour. This difference must be great enough to permit the core to be withdrawn when the bracing device is released again after the bending operation—which involves a narrowing of the pipe in the bending plane.

The wedge angle, that is the angle subtended by the faces 26 and the axis of the cable 10, on the one hand, must be large enough to prevent any self-locking, i.e. to permit the contraction of the expanding elements, but, on the other hand, it is desirable that as small as possible a proportion of the transverse forces acting on the expanding elements during bending is transformed via the wedge faces into tensile stress of the cable 10. The given angle of 30° lies in a range within which a sensible compromise between the two requirements can be achieved.

After expanding the expanding elements, the end faces 42 thereof facing each other are spaced from each other at a distance corresponding to the amount by which the two associated wedge elements with their machined bearing shells fall short of being semi-cylindrical. On bending the pipe, the end faces 42 of adjacent expanding elements move towards each other on the side of the wire cable 10 facing the centre of bending and, in order to allow also small bending radii, the end faces on that side are advantageously sloped in the manner of a wedge as indicated by the angle of slope "β" in FIG. 4. It should be mentioned that, if such a slope is provided, the segments are identical to each other in pairs only if the planes of separation are selected as stated above; in the case of diagonal separating planes, four different segments would be produced.

Before the means for bracing the core are described, the arrangement of the wedge and expanding elements for cylindrical pipes will be explained with reference to FIG. 2.

Whereas, in the case of pipes of rectangular cross-section, as a rule, only a bend in one single plane is envisaged and the core needs to be flexible, therefore, only in that plane, and hence the described cylinders 16 can be used as joints, in the case of cylindrical pipes, bending about several axes which are spatially oblique to one another is very often required. This means that, instead of the cylinders 16, balls 46 have to be provided. Accordingly, the bearing shells 48 of the wedge elements are constructed as hollow spheres. The same configuration can be chosen for the wedge faces as was used for rectangular pipes or, alternatively, a greater number of cooperating wedge faces and, accordingly, a greater number of expanding element segments can be provided; this Figure shows six wedge faces 50 and six segments 52, the external outline of which is advantageously so constructed that, in their expanded state, the segments define a circle with the internal radius of the pipe to be bent. Finally, it should also be mentioned that the slope with the angle "β" is to be provided in all segments in this case because the core itself may twist but must nevertheless allow bending about the smallest permissible radius.

Whereas, in the case of pipes of rectangular cross-section, a thin flexible sheet metal web 54 and 56, respectively, is arranged on the inside and/or on the outside of the core with respect to the centre of bending, these webs being removed first of all after bending, this is not possible, of course, in the case of cylindrical pipes.

The bracing devices can be seen in FIGS. 3 and 4. As shown in FIG. 4, a stop piece 60 is fixed, for example shrunk on, to one end of the wire cable 10. The stop piece has wedge faces 62 which co-operate with the nearest expanding element 14', and, furthermore, absorbs the tensile stress in the direction of the cable axis. The webs 54 and 56 extend beyond the stop piece 60 into the region of the pipe 64 that is not to be supported by the core.

FIG. 3 shows the other end of the core. There, the end of the cable is firmly connected, for example similarly by shrinking on, to a bracing element 65 consisting of a guide portion 66 having a cross-section that is not round, for example of square cross-section, and a threaded bolt portion 68. The guide portion 66 is accommodated in a guide formed by a channel 69 in a thrust-transmitting end piece 70, and the channel 69 is sealed by a cover plate 72 which is screwed on. The external contour of the thrust-transmitting end piece joined to the cover plate 72 fits into the end of the pipe and is provided, at the end face facing the members of the core, with wedge faces 74 which co-operate with the nearest expanding element 14" in a manner similar to that of the stop piece 60 and the expanding element 14'.

A bracing sleeve 76 is screwed onto the free end of the threaded bolt portion 68, which bracing sleeve rests against the thrust-transmitting end piece and, on being screwed further, presses the thrust-transmitting end piece along the wire cable 10 into the pipe thereby pushing the core members together, with the expanding elements being expanded as explained above. The bracing sleeve 76 is closed at its free end, and a collar 78 is fixed to the free end of the threaded bolt portion 68, for example pinned thereon or screwed onto it by means of a left-handed thread, that is to say a thread having a slope opposed to that of the sleeve thread. On screwing down the bracing sleeve 76, the collar finally runs to the closed end thereof whereby the user establishes that the desired shortening of the core, necessary for the expansion of all the expanding elements, has taken place. The collar 78 at the same time serves to prevent the bracing sleeve from being unintentionally screwed down completely and possibly lost.

In FIG. 3, a grip 80 will also be seen attached to the end of the web 54, by which the web can easily be withdrawn when the bracing sleeve is unscrewed again thereby cancelling the expansion of the expanding elements. Should expanding elements ever become jammed in the bent pipe despite the use of lubricants on all parts of the core, the core can be loosened slightly by tapping lightly with a hammer.

I claim:

1. Core for a pipe that is to be bent, comprised of elements that are coupled to one another in articulated manner, characterized in that there are arranged on a wire cable (10) separate wedge elements which are themselves articulated and, between successive wedge elements, expanding elements that can be expanded transversely to the extension of the cable, the wedge elements can be pushed together in the direction of extension of the cable with the expanding elements being expanded, each of such wedge elements being comprised of a joint member of round cross-section at least in the bending plane of the pipe and a semi-wedge member arranged at each side, having a bearing face complementary to the cross-section of the joint member.

2. Core for a pipe that is to be bent, according to claim 1, for pipes of rectangular cross-section, characterised in that the joint members are cylindrical.

3. Core for a pipe that is to be bent, according to claim 2, characterised by flexible webs that can be inserted into the pipe to be bent together with the core and withdrawn from the pipe after bending before removing the core.

4. Core for a pipe that is to be bent, according to claim 1, for pipes of round cross-section, characterised in that the joint members are spherical.

5. Core for a pipe that is to be bent, according to claim 1, characterized in that each expanding element is comprised of a plurality of ring segments, the common external contour of which is substantially complementary to the internal profile of the pipe to be bent, and having, in the region of its aperture, on each side of a plane of symmetry perpendicular to the axis of the cable, as many plane wedge faces as segment provided, and the wedge faces are constructed complementary to the counter wedge faces of the adjacent wedge elements, said wedge faces and adjacent wedge elements having an angle of substantially 30°, and resilient biasing means biasing the ring segments toward the axis of the cable.

6. Core for a pipe that is to be bent, according to claim 5, characterised in that the resilient elements comprise at least one O-ring which encompasses all the ring segments of the relevant expanding element.

7. Core for a pipe that is to be bent, according to claim 6, characterised by two O-rings to each expanding element.

8. Core for a pipe that is to be bent, according to claim 1, characterised in that the expanding elements taper in the manner of a wedge towards the centre of bending of the pipe.

9. Core for a pipe that is to be bent, according to claim 1, characterised in that the wire cable is firmly connected at one end to a stop piece and firmly connected at the other end to a threaded bolt portion onto which a bracing sleeve which pushes the elements together can be screwed.

10. Core for a pipe that is to be bent, according to claim 9, characterised in that the stop piece is at the same time constructed as a wedge element.

11. Core for a pipe that is to be bent, according to claim 9, characterised in that an end face portion, facing the elements, of the bracing sleeve is at the same time constructed as a wedge element.

12. Core for a pipe that is to be bent, according to claim 9, characterised by a stop arrangement for limiting the bracing distance.

13. Core for a pipe that is to be bent, according to claim 9, characterized in that an end face portion, facing the elements, of the bracing sleeve is at the same time constructed as a wedge element.

14. Core for a pipe that is to be bent, according to claim 1, characterized in that the expanding elements taper in the manner of a wedge toward the center of bending of the pipe.

* * * * *